United States Patent [19]

Davis

[11] Patent Number: 4,616,806

[45] Date of Patent: Oct. 14, 1986

[54] VALVE

[75] Inventor: Bill G. Davis, Phoenix, Ariz.

[73] Assignee: Jetco, Inc., Phoenix, Ariz.

[21] Appl. No.: 751,474

[22] Filed: Jul. 3, 1985

Related U.S. Application Data

[63] Continuation of Ser. No. 534,797, Sep. 22, 1983, abandoned.

[51] Int. Cl.⁴ .............................................. F16K 31/12

[52] U.S. Cl. ..................................... 251/63.4; 137/87; 251/282; 123/198 DB

[58] Field of Search ....................... 251/63.4, 63.5, 63, 251/282, 62, 117; 137/87, 94, 513.3, 625.66, 625.4; 123/198 DB

[56] References Cited

U.S. PATENT DOCUMENTS

| | | | |
|---|---|---|---|
| 2,896,903 | 7/1959 | Canalizo | 251/63 |
| 3,099,282 | 7/1963 | Miller et al. | 137/87 |
| 3,317,181 | 5/1967 | Robbins, Jr. | 251/63.4 |
| 3,517,688 | 6/1970 | Scholle | 251/63.6 |
| 3,523,521 | 8/1970 | Goodwin | 137/87 |
| 3,888,457 | 6/1975 | Taylor | 137/625.66 |
| 3,985,046 | 10/1976 | Morris et al. | 251/63.4 |
| 4,067,348 | 1/1978 | Davis | 137/87 |
| 4,073,466 | 2/1978 | Snyder | 137/625.66 |
| 4,080,946 | 3/1978 | Cunningham | 123/198 DB |
| 4,091,832 | 5/1978 | Snyder et al. | 137/625.66 |
| 4,178,901 | 12/1979 | Cunningham | 123/198 DB |
| 4,209,040 | 6/1980 | Peters | 137/625.66 |
| 4,217,934 | 8/1980 | Peters | 137/625.66 |
| 4,304,253 | 12/1981 | Roger | 251/62 |
| 4,420,011 | 12/1983 | Roger | 251/62 |
| 4,491,154 | 1/1985 | Peters | 137/625.66 |

*Primary Examiner*—Samuel Scott
*Assistant Examiner*—H. A. Odar
*Attorney, Agent, or Firm*—Cahill, Sutton & Thomas

[57] ABSTRACT

A valve device for insertion in the fuel line of an internal combustion engine between the engine and the fuel pump therefor and adapted to impede the flow of fuel to the engine in response to a reduction in pressure in the lubricating oil system for the engine. The device is insensitive to variations in fuel pressure and flow rate by virtue of having a fuel pressure balancing piston associated with the valve and having an oil pressure sensitive piston substantially isolated from the fuel pressure and flow.

1 Claim, 3 Drawing Figures

VALVE

This application is a continuation of Ser. No. 534,797, filed Sept. 22, 1983 now abandoned.

TECHNICAL FIELD

This invention relates to valve devices for use in controlling the flow of fuel to an internal combustion engine.

BACKGROUND ART

It has long been recognized that loss of lubricating oil pressure for an internal combustion engine can result in serious mechanical damage to the engine components if the engine continues to run. Early on, inventors devised valves for shutting off the flow of fuel to an engine in response to the loss of lubricating oil pressure. See, for example, U.S. Pat. No. 1,339,798 granted May 11, 1920 to G. W. Thompson for "Valve."

An improved valve for this same purpose is disclosed in my U.S. Pat. No. 4,067,348 granted Jan. 10, 1978 for "Fuel Shutoff Valve." The valve disclosed in this patent displays some sensitivity to variations in the pressure of the fuel passing therethrough. In other words, changes in fuel pressure, which are experienced with changes in engine speed, can cause that valve to operate to terminate or impede fuel flow at different oil pressures. Consequently, it has been the practice to install this valve upstream of, i.e., on the suction side of, the fuel pump in order to minimize the fuel pressure variations to which the valve is subjected.

All valves, filters and the like, on the suction side of the fuel pump are subjected to below atmospheric pressure so that if any of these devices leak, they allow air to enter the fuel system. This can be deleterious, particularly to diesel engines. Therefore, it is preferred that any fuel control valve and any filter associated therewith be located on the downstream, or outlet, side of the fuel pump. But this location, of course, subjects the fuel control valve to significant fuel pressure variations with changes in engine speed. Others have devised fuel control valves for installation between the fuel pump and the engine. See, for example, U.S. Pat. No. 3,148,671 granted Sept. 15, 1964 to F. Botterff et al. for "Fuel Control for Internal Combustion Engines" and U.S. Pat. No. 3,523,521 granted Aug. 11, 1970 to J. E. Goodwin for "Pressure Responsive Engine Fuel Device with Variable Shutoff Point." The Bottorff et al. patent discloses a valve the operation of which can be influenced by the rate at which fuel flows therethrough. The Goodwin patent discloses a valve structure which is intended to take advantage of variations in fuel pressure for the very purpose of changing the lubricating oil pressure at which the valve is closed to shut off the flow of fuel.

The present invention is premised on the belief that the most useful fluid flow control valve is one having a reliable and predictable response to lubricating oil pressure. The valve which always opens and closes at predetermined lubricating oil pressures without regard to pressure in the fuel line or the rate of flow of fuel through the valve is deemed to best meet the needs of engine operators. The principal objective of this invention is the provision of such a valve.

DISCLOSURE OF INVENTION

This invention contemplates a fuel control valve device having a valve means which is balanced against the influence of pressure and rate of flow of the fuel in and flowing through the valve device. Specifically the invention contemplates a device having a valve body with a bore therein having a pair of fuel inlet passages to the bore and a fuel outlet passage from the bore intermediate the two inlet passages. Disposed within the bore and adapted to seat against a valve seat disposed between one inlet passage and the outlet passage is an axially movable valve member. Also disposed in the bore, but between the other inlet passage and the outlet passage, is a balancing piston which is axially movable within the bore and attached to the valve member. The arrangement is such that with the valve member seated, i.e., closed, the fuel pressure acting on one face thereof, is opposed by a like force of fuel pressure acting on one face of the balancing piston. With the valve member in its open position, fuel pressure acts on the opposite faces of the balancing piston to essentially balance the forces acting to move the valve member. Movement of the valve member to its open or to its closed position is, therefore, dictated by other external forces applied thereto, such as a spring and the lubricating oil pressure responsive means and not the fuel pressure or rate of flow of fuel through the valve body.

A further feature of construction of the fuel control valve of this invention which renders operation of the valve independent of the pressure and rate of flow of the fuel therethrough is a novel arrangement of the lubricating oil pressure responsive means which isolates that means from the pressure and flow of the fuel through the valve body. To this end, the valve body is provided with a second bore independent of but connected by means of a passage to the first bore therein. This second bore contains a piston against which lubricating oil pressure is directed. A push rod connected to the piston and extending through and sealing the passage between the two bores in the valve body serves to transmit motion of the lubricating oil piston to the valve member in the first bore. The push rod seals the passage between the two bores so that the second piston is not subjected to pressure of the fuel in the first bore.

BEST MODES FOR CARRYING OUT THE INVENTION

Figure 1:
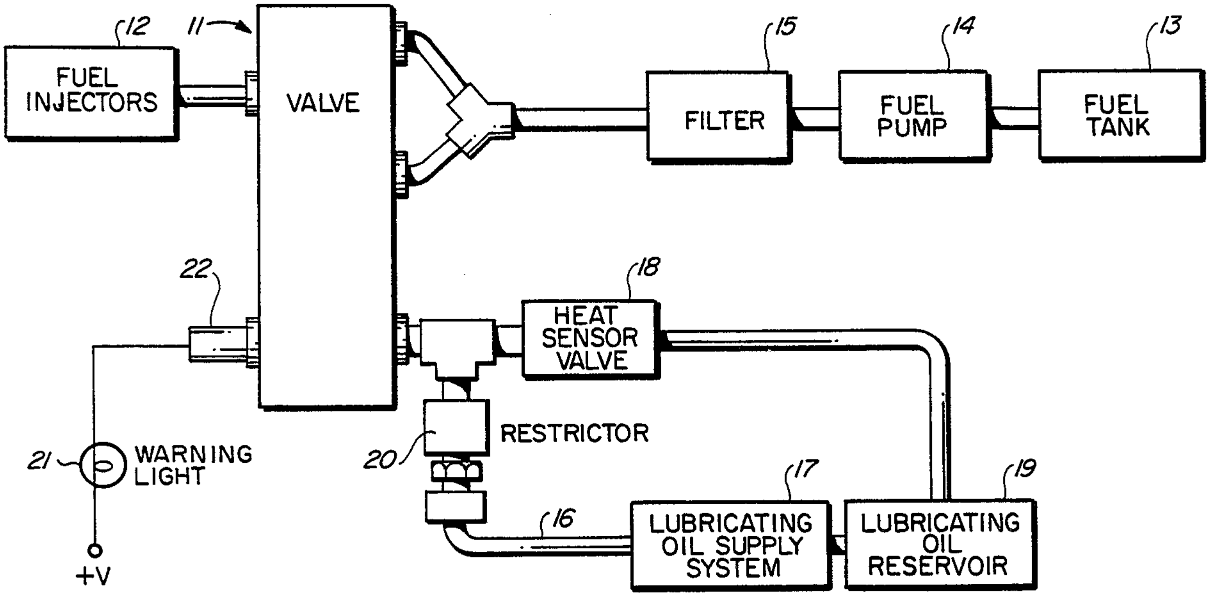
FIG. 1 is a schematic diagram of a fuel control system embodying the valve device of this invention.

Referring particularly to FIG. 1, the numeral 11 designates a valve device adapted to control the flow of fuel to the fuel injectors 12 of an internal combustion engine, which fuel is supplied from a fuel tank 13 by means of fuel pump 14 through a filter 15 and to valve 11. The purpose of valve 11 is to cut off, or at least significantly reduce the flow of fuel to the fuel injectors 12 of the engine in the event the valve senses an abnormal operating condition of the engine. In the system illustrated in FIG. 1, the valve device 11 is adapted to respond to either a substantial reduction in pressure in the lubricating oil supply system for the engine or an overheating condition, as evidenced by an abnormally high cylinder head temperature.

For the purpose of sensing lubricated oil pressure, the valve device 11 communicates by means of a conduit 16 with the lubricating oil supply system 17. A heat sensor valve 18 also connected to conduit 16 supplying oil under pressure to valve device 11 is capable, upon sensing an abnormally high cylinder head temperature, of dumping lubricating oil from conduit 16 into a reservoir 19 thereby subjecting the valve device 11 to a reduced lubricating oil pressure much like that it experiences when there is a failure in the lubricating oil supply system. In either of these two events, the valve device 11 is adapted to shut off or substantially reduce the flow of fuel therethrough to the fuel injectors so that the engine is either shut down or caused to idle so as to substantially reduce the likelihood of any permanent damage occurring as a result of the malfunction.

A restrictor 20 in oil supply conduit 16 ahead of the connection with the heat sensor valve 18 serves to keep the lubricating oil pressure up in the remainder of the supply system whenever sensor valve 18 opens to dump oil to reservoir 19. This serves to maintain the supply of lubricating oil to the engine even though the over heated condition of the engine has warranted the signaling of valve device 11 to close off the supply of fuel.

The system illustrated in FIG. 1 also may include a warning light 21 connected to a pressure sensitive switch 22 connected to valve device 11 in such a manner as to also sense the pressure of lubricating oil within valve 11. Switch 22 is adapted to close upon sensing a reduction in lubricating oil pressure and to complete a circuit to warning light 21 which is disposed within the cab of the motor vehicle utilizing the internal combustion engine to warn the driver of an impending shut down of his engine.

Fuel control systems such as that illustrated in FIG. 1 and described generally above are known in the art and various valve devices 11 have been devised for the purpose of controlling the flow of fuel. It is to be noted that valve device 11 is disposed between fuel pump 14 and fuel injectors 12 and is therefore subjected to varying pressures and rates of flow of fuel as the speed of the engine is changed. Valve devices 11 of the prior art have been somewhat unreliable when operating under these conditions because the varying fuel pressures and flow rates to which the valve is subjected often causes the valve to function erratically and cut off the flow of fuel to the engine at different lubricating oil pressures depending upon the speed at which the engine is operating.

Figure 2:
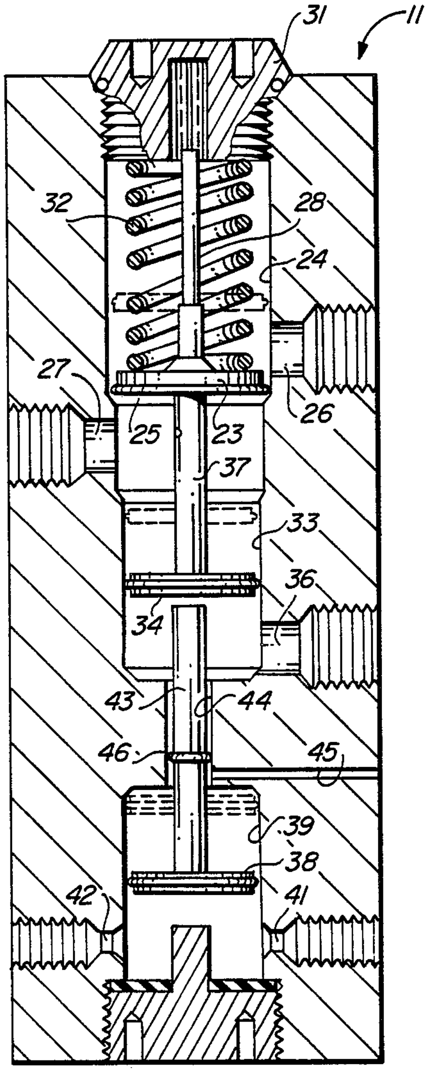
FIG. 2 is a vertical sectional view through the valve body of the valve device of this invention.
Figure 3:
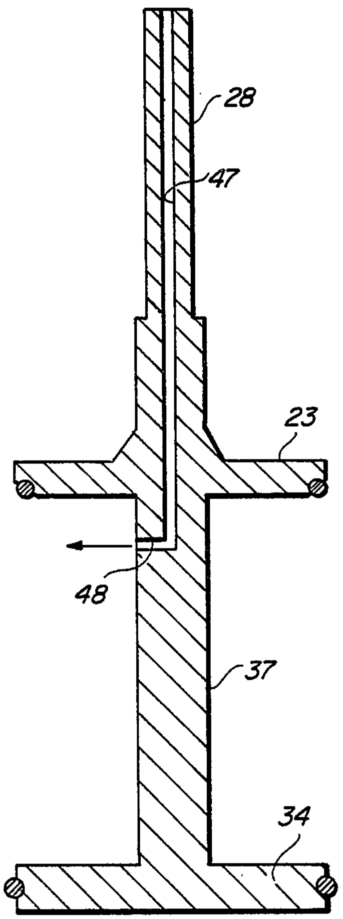
FIG. 3 is a sectional view through a valve member employed in the valve device of FIG. 2.

The valve device 11 of this invention, which is illustrated in greater detail in FIGS. 2 and 3, is specifically designed to be essentially unresponsive to changes in fuel pressure and rate of flow so as to operate in a predictable manner to shut down the engine or reduce it to idle speed regardless of the speed at which the engine was operating at the time of the malfunction.

The control of flow of fuel through valve device 11 is effected by means of a valve member 23 disposed for axial movement within a generally vertically disposed clyindrical bore 24 having a chamfered seat 25 which is engaged by the valve member 23 to close off the flow of fuel through the valve bore 24. Seat 25 is disposed in bore 24 between a fuel inlet passage 26 and a fuel outlet passage 27, both of which communicate with the bore 24. Valve member 23 has a stem 28 extending vertically upwardly from the center thereof and projecting into a splined guide opening 29 in a cap 31 threadably received in the upper wall of valve device 11. Cap 31 closes the upper end of bore 24. A helical spring 32 surrounding valve stem 28 and compressed between cap 31 and valve member 23 urges valve member 23 toward its closed position in engagement with seat 25.

In order to desensitize valve member 23 from the pressure of fuel within bore 24, there is provided in the lower region 33 of bore 24 a balancing piston 34 positioned for axial movement within the bore between a second fuel inlet passage 36 and fuel outlet passage 27. A connecting rod 37 connects balancing piston 34 and valve member 23 so that the latter two elements move in unison. When the valve member 23 is in its closed position against seat 35, i.e., the solid line position illustrated in FIG. 2, forces resulting from the pressure of fuel within bore 24 act substantially equally against the upper face of valve member 23 and the lower face of balancing piston 34 so that the forces required to open valve member 23 are essentially those required to overcome the force of spring 32 and are independent of the pressure of the fuel in bore 24. When valve member 23 is in its open position, i.e., the dotted line position shown in FIG. 2, fuel pressure acting against the upper and lower faces of balancing piston 34 create essentially balanced forces acting thereon so that no force is transmitted through connecting rod 37 to valve member 23. Thus, the forces required to hold the valve member 23 open are essentially those required to balance the force exerted by compressed spring 32. Moreover, when valve member 23 is in its open position, it is above inlet 26 and essentially outside the path of fuel flowing from inlet 26 through bore 24 to outlet passage 27 so that the rate of fuel flow through the valve does not influence directly the forces acting on the valve member 23 to keep it open or to move it to a closed position.

Actuation of valve member 23 is accomplished by lubricating oil pressure sensitive means including a piston 38 disposed for axial movement within a second bore 39 provided within the lower portion of valve member 11. Lubricating oil is supplied to bore 39 from conduit 16 via an oil inlet passage 41 communicating with bore 39. Bore 39 is also provided with another passage 42 in communication therewith which is adapted to receive pressure sensitive light switch 22 so that the switch is subjected to essentially the same lubricating oil pressure as is piston 38.

When lubricating oil is supplied under pressure to bore 39 piston 38 is moved upwardly within the bore and this movement of the piston is transmitted to valve member 23 by means of a push rod 43 which extends through a passage 44 communicating at its lower end with bore 39 and at its upper end with the lower region 33 of upper bore 24. Push rod 43 seals passage 44 and prevents communication between bore 39 and bore 24 and is equipped for this purpose with an O-ring 46. A vent passage 45 in valve body 11 permits air to enter and leave that portion of bore 39 which is above piston 38.

Upward movement of piston 38 within bore 39 under the influence of lubricating oil pressure drives connecting rod 43 upwardly until it contacts the lower face of piston 34 in bore 34 and through connecting rod 37 moves valve member 23 upwardly away from its seat 25.

This movement of valve member 23 is, of course, opposed by the force of helical spring 32 which determines the amount of force required to move valve member 23 to its open position away from seat 25. The calibration of spring 32 thus determines the amount of pressure of lubricating oil beneath piston 38 required to open valve member 23. Conversely, the calibration of spring 32 determines the amount of reduction in lubrication oil pressure acting on piston 38 which must be experienced before spring 32 forces valve member 23 into its closed position to alter the flow of fuel to the internal combustion engine.

It will be noted that the only portion of piston 38 that is subjected to the pressure of fuel within bore 24 is that area equivalent to the cross sectional area of push rod 43 which actually extends into bore 24. Because the cross sectional area of push rod 43 is quite small in comparison with the overall area of piston 38, the pressure of fuel in bore 24 has virtually no influence on the forces acting on piston 38 and available to effect opening or closing of valve member 23. Thus, the operation of valve device 11 is virtually insensitive to pressure of fuel therein so that the operation thereof is not dependent upon the speed of operation of the internal combustion engine.

Operators of some vehicles employing fuel systems equipped with the valve device 11 prefer that upon a malfunction of the engine, the fuel supply would not be completely interrupted but merely reduced to a restricted quantity so that the engine is caused to idle rather than stop. With such a valve associated with a motor vehicle, the engine of the vehicle can be operated to move the vehicle to a safe location but the speed of operation of the engine is restricted so as not to cause significant damage to the engine from the malfunction, whether it be a reduction in lubricating oil pressure or an abnormally high cylinder head temperature. To provide for this reduced flow of fuel to the engine even though valve member 23 is seated against its seat, 25, the valve device 11 may be provided with a restricted vent, or bypass, providing communication between fuel inlet passage 23 and fuel outlet passage 27. A preferred arrangement for this bypass is illustrated in FIG. 3 and includes an elongated restricted passage 47 extending axially from the upper end of valve stem 28 to a region beneath valve member 23 where it communicates with a radial outlet passage 48 in connecting rod 37. It can readily be appreciated that the two passages 47 and 48 permit a restricted flow of fuel past the valve member 23 so that the engine with which the valve device 11 is associated can be idled even though there is a significant reduction in the pressure of lubricating oil within bore 39.

There are two other advantages stemming from provision of bypass passages 47 and 48. The first of these is that these passages can provide for the initial flow of fuel to the engine on start-up when, because of a lack of oil pressure, valve member 23 will normally be in its closed position. The passages 47 and 48 provide sufficient fuel to start the engine and have it idle until lubricating oil pressure builds up within bore 39 and raises piston 38 to open valve member 23 for normal operation of the engine. Secondly, by having the passage 47 communicate with the uppermost region of bore 24, it is possible for passages 47 and 48 to purge bore 24 of any air that may be trapped there during start-up following initial installation of the fuel control system or following any repair period during which the fuel is drained from the system.

From the foregoing it should be apparent that this invention provides a novel fuel control valve adapted to be disposed between the fuel pump and the engine with which it is associated to control the flow of fuel to the engine in response to abnormal conditions without being influenced by the pressure fluctuations or flow rate variations of the fuel passing through the valve device.

What is claimed is:

1. A valve device for controlling the flow of fuel to an internal combustion engine having a pressurized lubricating oil system associated therewith, said valve being adapted to be disposed in the fuel line between a fuel pump and the engine, said device comprising a valve body having a bore with an axis therein, a pair of fuel inlet passages in said body both simultaneously and continuously communicating with said bore and said fuel line, means providing a valve seat between one of said inlet passages and said outlet passage, valve means disposed in said bore and moveable axially therein for cooperation with said valve seat to close communication between said one inlet passage and said outlet passage, a balancing piston disposed in sealing relationship with said bore between the other of said inlet passages and said outlet passage and moveable axially in said bore, means connecting said piston and said valve means for transmitting fuel pressure forces acting on said piston to said valve means, the construction and arrangement being such that when said valve means is out of engagement with said valve seat pressure from fuel entering said bore through said one inlet passage acts on one side of said piston and balances pressure from fuel entering said bore through said other inlet passage and acting on the opposite side of said piston, spring means urging said valve means into engagement with said valve seat, means carried by said valve body and adapted to communicate with and to be moved in response to changes in the pressure in the lubricating oil system of the engine, and mans for transmitting movement of said pressure responsive means to move said valve means away from said valve seat when the pressure responsive means senses a predetermined pressure in said oil system.

* * * * *